(12) United States Patent
Bentley

(10) Patent No.: US 8,540,056 B2
(45) Date of Patent: Sep. 24, 2013

(54) ENGINE DEVICE FOR GUARDING AGAINST LEAKS

(76) Inventor: Roy Bentley, Surrey (CA)

( * ) Notice: Subject to any disclaimer, the term of this patent is extended or adjusted under 35 U.S.C. 154(b) by 531 days.

(21) Appl. No.: 12/823,991

(22) Filed: Jun. 25, 2010

(65) Prior Publication Data

US 2011/0108361 A1 May 12, 2011

(30) Foreign Application Priority Data

Nov. 9, 2009 (CA) .................................. 2685164

(51) Int. Cl.
F16N 31/00 (2006.01)

(52) U.S. Cl.
USPC ........................................................ 184/106

(58) Field of Classification Search
USPC .............. 184/106, 104.2, 6.12, 1.5; 180/69.1
See application file for complete search history.

(56) References Cited

U.S. PATENT DOCUMENTS

| | | | | |
|---|---|---|---|---|
| 2,732,024 A * | 1/1956 | Schonwald | ................... | 180/69.1 |
| 2,841,245 A * | 7/1958 | Colgan | ........................ | 180/69.1 |
| 2,899,019 A * | 8/1959 | Colgan | ......................... | 184/106 |
| 3,147,981 A * | 9/1964 | Woerheide | .................... | 277/370 |
| 3,316,995 A * | 5/1967 | Fay | .............................. | 180/69.1 |
| 3,333,652 A * | 8/1967 | Tribuzi | ........................ | 180/69.1 |
| 3,651,884 A * | 3/1972 | Dorries | ........................ | 180/69.1 |
| 3,815,702 A * | 6/1974 | Paananen | ..................... | 180/69.1 |
| 4,084,655 A * | 4/1978 | Savron | ........................ | 180/69.1 |
| 4,875,537 A * | 10/1989 | Garnatz et al. | ............... | 180/69.1 |
| 4,909,355 A * | 3/1990 | Ramos | ........................ | 184/106 |
| 4,936,418 A * | 6/1990 | Clausen | ....................... | 184/106 |
| 5,314,625 A * | 5/1994 | Farnelli | ........................ | 210/695 |
| 5,404,848 A * | 4/1995 | Nelson | ...................... | 123/198 E |
| 5,526,900 A * | 6/1996 | Mason | ........................ | 184/106 |
| 5,634,755 A * | 6/1997 | Jones, Jr. | ..................... | 411/383 |
| 5,711,402 A * | 1/1998 | Sumpter, Sr. | ................ | 184/106 |
| 5,839,531 A * | 11/1998 | McGee | ........................ | 180/69.1 |
| 6,170,586 B1 | 1/2001 | Stroman | | |
| 6,378,639 B1 * | 4/2002 | Murray | ........................ | 180/69.1 |
| 2007/0029336 A1 | 2/2007 | Posada | | |

* cited by examiner

Primary Examiner — Michael Mansen
Assistant Examiner — Henry Liu
(74) Attorney, Agent, or Firm — Nexus Law Group LLP

(57) ABSTRACT

An oil pan leak guard that is attachable to the undersurface of an oil pan. The leak guard has a wire framework, an oil absorbent material supported by the wire framework, and a washer integrated with said wire framework. The washer provides a leak guard opening that receives the oil plug of the oil pan. The washer is clamped against the oil pan when the oil plug is received through the leak guard opening, screwed into the oil plan opening, and tightened.

6 Claims, 3 Drawing Sheets

ENGINE DEVICE FOR GUARDING AGAINST LEAKS

PRIORITY

This application claims priority benefits of Canadian Application 2,685,164, filed on Nov. 9, 2009.

FIELD OF THE INVENTION

The present invention relates to an engine device for intercepting leaks from an engine or oil pan before they fall on the roadway and contaminate the ground water.

BACKGROUND

Motor vehicles have a large number of moving parts which operate in an environment of hot fluids. These moving parts are subjected to wide swings in temperature due to heating and cooling. It is not surprising that motor vehicles frequently develop oil leaks at such places as the oil pan and the seals. Hot oil leaking onto the pavement washes into the soil or enters the storm drain system where it flows into rivers and oceans, contaminating the environment. The oil that remains on driveways and parking lots makes the roads unsightly and slick when wet. Systems are being put in place which catch these leaks in membranes in which the hydrocarbons decompose before being washed away. However, such systems are expensive and unlikely to be installed on a widespread basis. Consequently, a system is needed which prevents such leaks from reaching the pavement or roadway.

There are many prior art devices designed to catch oil and other fluids which drip primarily from automobiles. Most such devices employ rigid pans which do not conform well to an irregular surface of a leaking part. Rigid pans can also fill with water or debris which prevents the pan from effectively collecting dripping fluids. U.S. Pat. No. 6,170,586 issued to Stroman discloses use of a flexible absorbent pad made from heat resistant material to catch the leaks. An outer sheet is bonded to the bottom side of the absorbent pad to retain accumulated oil or other fluids which may pass though the absorbent pad. Tethers such as wires, cords, etc are glued to the outer sheet and absorbent pad and are used to fasten the pad next to a fluid leak by connecting the tether together around the vehicle structure which is leaking. The use of several tethers is somewhat inconvenient as they require a suitable vehicle structure to receive them.

SUMMARY OF THE INVENTION

According to the invention there is provided an oil pan leak guard having a wire mesh framework, an oil absorbent material supported by the wire framework, and a washer integrated with said wire framework for receiving an oil plug and clamping the washer as the oil plug is tightened in a oil pan opening;

The oil absorbent material forms a first layer covering a first side of the wire mesh framework and a second layer covering a second side of the wire framework.

The mesh wire framework and oil absorbent material are bendable to a new set orientation around a bottom edge of said oil pan.

The guard may have a plurality of openings which align with oil pan openings of different models of motor vehicles.

The oil pan opening is threaded with threads that register with threads of the oil plug and the oil plug passes through an opening in said washer.

The guard has a fastener hole near a periphery thereof and including a strap which fastens to the fastener opening at one end and to an undercarriage of a motor vehicle at another end.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
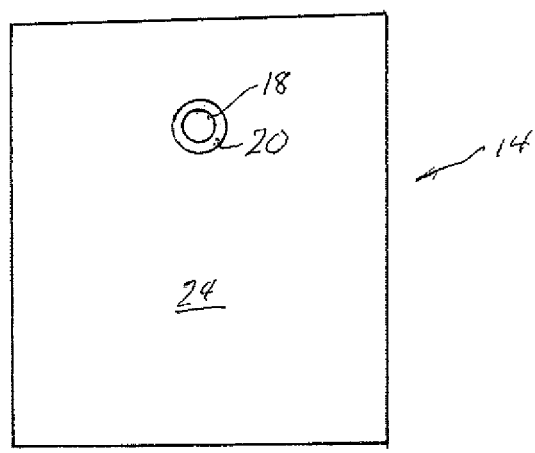
FIG. 1 is a plan view of the engine device.
Figure 2:
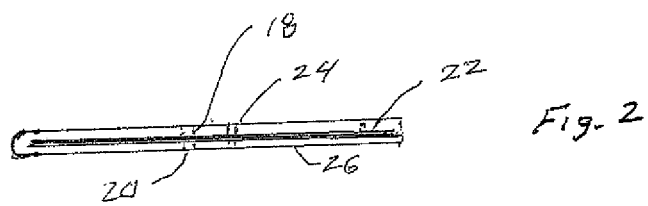
FIG. 2 is a edge view of the engine device.
Figure 3:
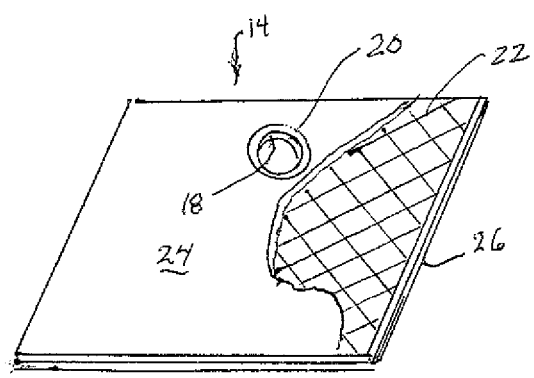
FIG. 3 is a perspective view of the engine device with part of the top pad cut away.

Referring to FIGS. 1 to 5 of the drawings, an engine device in the form of an oil guard 14 has a central wire mesh framework 22 which supports an absorptive pad 24 on one side and an absorptive pad 26 on the other side. The absorptive material can be treated natural fibers, natural fabric, absorbent paper based material or any other oil absorptive material. which is heat resistant. The guard 14 has an opening 18 provided by a washer 20 which is affixed to the wire mesh framework 22. When the wire mesh framework 22 is bent into a particular position, it stays in that position without there being any restoring force.

Obviously the pad can be configured into a variety of shapes which more closely conform to a leaking vehicle part or structure.

Figure 4:
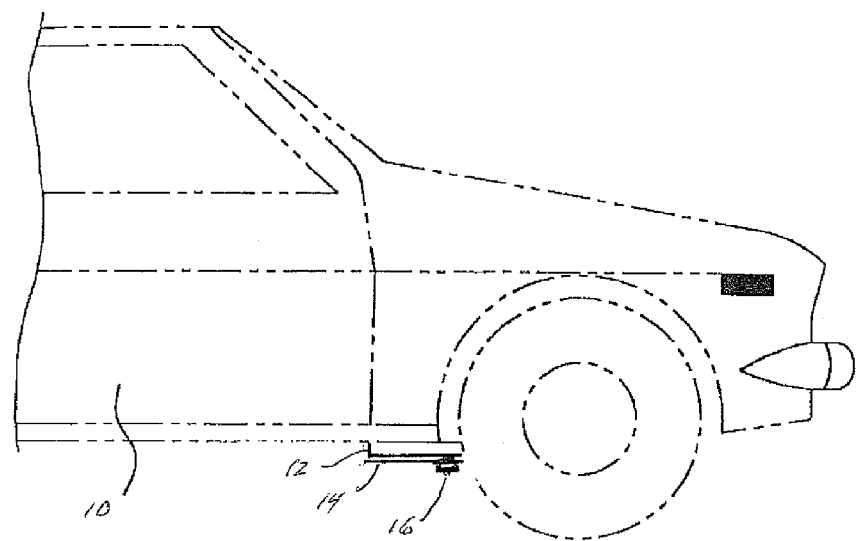
FIG. 4 is a drawing of an automobile showing the oil pan and the way the engine device is mounted.
Figure 5:
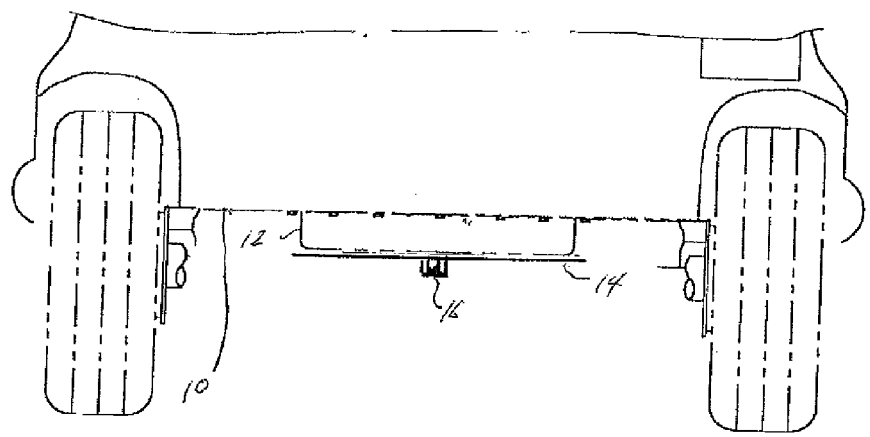
FIG. 5 is a front view of the under carriage of an automobile with the engine device attached to the oil pan.

As seen in FIGS. 4 and 5, the guard 14 is attached to the underside of the oil pan 12 by first removing the oil plug 16 and then draining the oil. After the oil has been drained, the guard 14 is installed by simply passing the threaded portion of the plug 16 though the opening 18 and engaging the threads of the plug with those of the opening 18. The wire mesh framework 22 provides sufficient stiffness so that the guard 14 doesn't flex downwardly.

In the event it is desired to have one model of engine device cover several plug placements a number of openings 18, 18a may be provided.

Once in place any fluids leaking onto the absorptive pad are absorbed. Any fluids passing through the upper pad 24 fall onto and are absorbed by the lower pad 26. As a consequence monitoring of the guard is less critical as the guard continues to function even when the first pad is saturated with oil.

Figure 6:
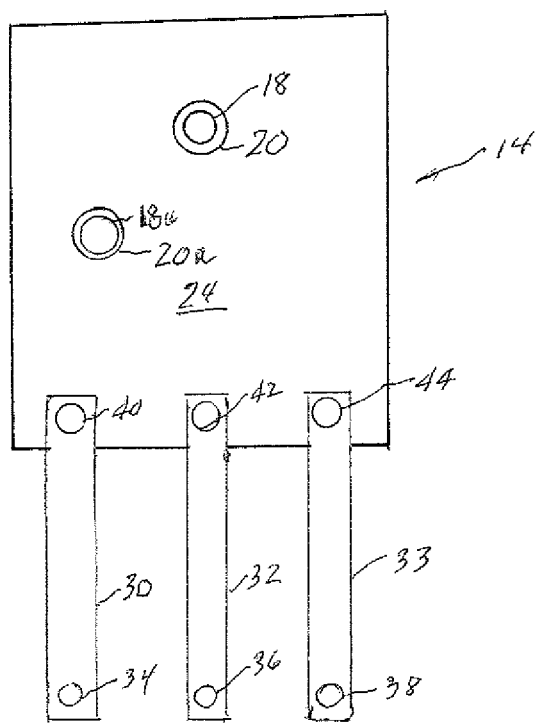
FIG. 6 is a plan view of the guard with an alternative oil plug opening and a plurality of straps attachable to an end of the guard and to an undercarriage of a motor vehicle.

Air flow around an engine depends on the volume of space present. In some cases air flow can be very strong and may flex the guard. To prevent this flexing, provision may be made for straps 30, 32, 33 to be fastened at one end to the under side of the engine (not shown) by bolt holes 34, 36, and 38 and at the other end by bolt holes 40, 42, 44 to the guard 14 as shown in FIG. 6. Connection to the engine rather than the undercarriage is made to avoid damage to the straps by movement of the engine relative to the undercarriage.

In summary, the features of the invention are set forth, at least in part, by the following enumerated statements:

Statement 1. The invention comprises an oil pan leak guard comprising: (a) a wire framework; (b) an oil absorbent material supported by the wire framework; (c) a washer integrated with the wire framework for receiving an oil plug and clamping the washer as the oil plug is tightened in a oil pan opening.

Statement 2. The invention also comprises the leak guard of Statement 1 wherein the oil absorbent material forms a first layer on a first side of the wire framework and a second layer on a second side of the wire framework.

Statement 3. The invention also comprises the leak guard of Statement 1 wherein the wire framework and oil absorbent material are bendable to a new set orientation around a bottom edge of the oil pan.

Statement 4. The invention also comprises the leak guard of Statement 1 wherein the guard has a plurality of openings which align with oil pan openings of different models of motor vehicles.

Statement 5. The invention also comprises the leak guard of Statement 1 wherein the oil pan opening is threaded with threads that register with threads of the oil plug and the oil plug passes through an opening in the washer.

Statement 6. The invention also comprises the leak guard of Statement 1 wherein the guard has a fastener hole near a periphery thereof and including a strap which fastens to the fastener opening at one end and to an undercarriage of a motor vehicle at another end.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A leak guard for an oil pan of an engine, wherein the oil pan has an oil plug and an oil pan opening that receives the oil plug, said leak guard comprising:
   (a) a wire mesh framework;
   (b) an oil absorbent material supported by said wire mesh framework; and,
   (c) a washer integrated with said wire mesh framework, wherein said washer provides a leak guard opening in the leak guard for receiving the oil plug;

wherein said washer is clamped against the oil pan when the oil plug is received through i) the leak guard opening and ii) the oil pan opening, and tightened, whereby said leak guard is attached to an underside of the oil pan.

2. A leak guard according to claim 1, wherein said oil absorbent material comprises: (a) a first layer on a first side of said wire mesh framework; and, (b) a second layer on a second side of said wire mesh framework.

3. A leak guard according to claim 1, wherein said wire mesh framework and said oil absorbent material are bendable to a particular position.

4. A leak guard according to claim 1, further comprising a plurality of leak guard openings, wherein said openings align with oil pan openings of different models of motor vehicles.

5. A leak guard according to claim 1, wherein said absorbent material is chosen from the group consisting of: treated natural fibers, natural fabric, and absorbent paper.

6. A leak guard according to claim 1, further comprising: (a) a fastener hole in said wire mesh framework; and, (b) a strap to prevent flexing of said wire mesh framework, said strap having a first end and a second end, wherein said first end of said strap fastens to said fastener hole, and wherein said second end of said strap fastens to the engine.

* * * * *